(No Model.)
W. B. LAWRENCE & F. W. REISINGER.
DRAFT EQUALIZER.
No. 466,694. Patented Jan. 5, 1892.
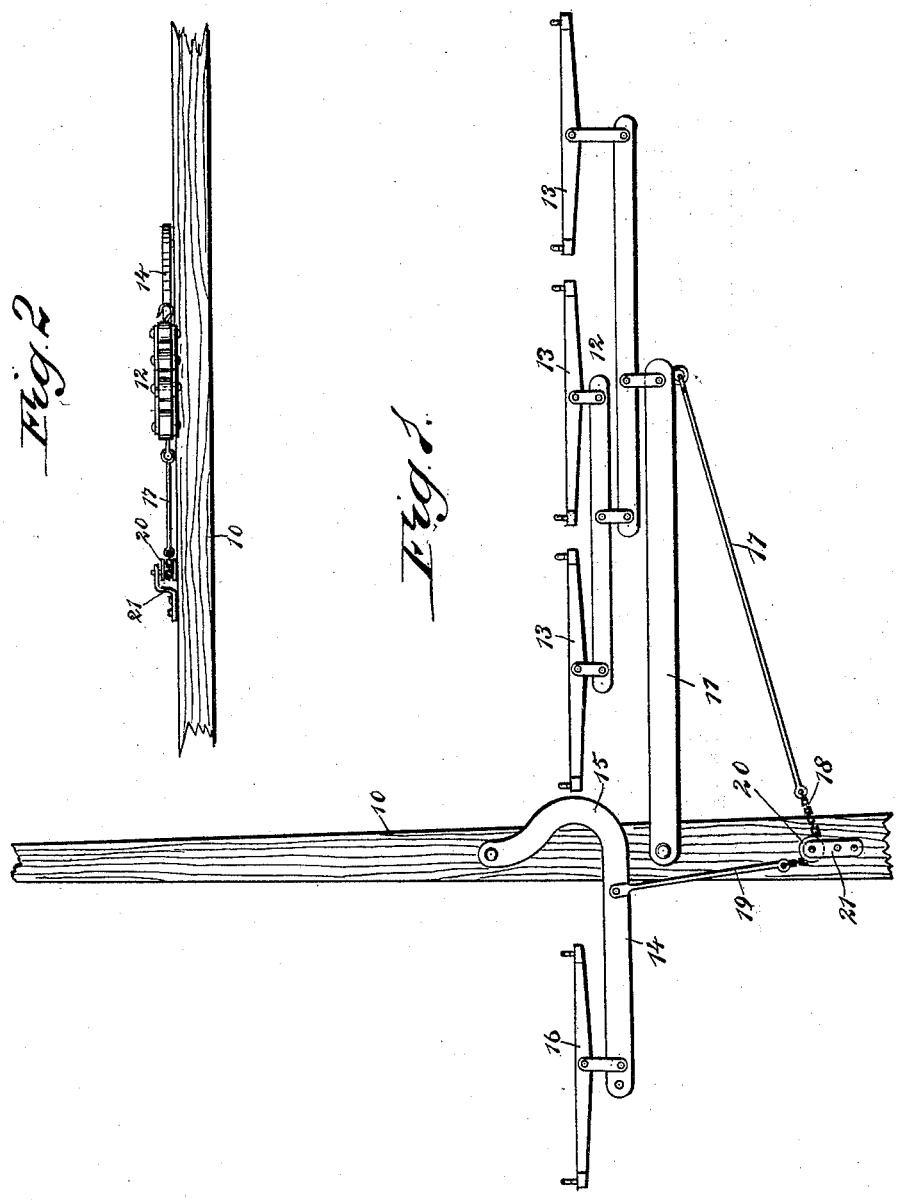
WITNESSES:
INVENTORS

UNITED STATES PATENT OFFICE.

WALTER B. LAWRENCE, OF TRAER, AND FRANK W. REISINGER, OF LA PORTE, IOWA; SAID LAWRENCE ASSIGNOR TO SAID REISINGER.

DRAFT-EQUALIZER.

SPECIFICATION forming part of Letters Patent No. 466,694, dated January 5, 1892.

Application filed April 1, 1891. Serial No. 387,281. (No model.)

*To all whom it may concern:*

Be it known that we, WALTER B. LAWRENCE of Traer, in the county of Tama and State of Iowa, and FRANK W. REISINGER, of La Porte city, in the county of Black Hawk and State of Iowa, have invented a new and Improved Draft-Equalizer, of which the following is a full, clear, and exact description.

Our invention relates to improvements in draft-equalizers; and the object is to produce a simple and inexpensive device, which may be attached to a pole, so that an unequal number of horses may be worked on different sides of the pole and still have an equal forward pull upon it, and also to provide means for remedying the side draft of the pole.

To this end our invention consists in certain features of construction and combinations of parts, which will be hereinafter described and claimed.

Reference is to be had to the accompanying drawings, forming a part of this specification, in which similar figures of reference indicate corresponding parts in both views.

Figure 1 is a plan view of the equalizer as applied to a pole, and Fig. 2 is a partial side elevation of the same.

The pole 10 is of the usual form, and extending laterally from it near the rear end is a lever 11, which is pivoted to the pole, and secured to the outer end of the lever 11 is the ordinary evener 12, carrying whiffletrees 13 for three horses. Pivoted to the pole a little in advance of the lever 11 is a lever 14, which also extends laterally from the pole, but on the side opposite from the lever 11, and the lever 14 has an outward bend, as shown at 15, which bend comes above the top of the pole, and the outer end of the lever 14 carries a whiffletree 16, for a single horse. The outer end of the lever 11 is connected by a rod 17 with one end of a chain 18, and the opposite end of the chain 18 is connected by a rod 19 with the lever 14, the chain being passed around a pulley 20, which is held in a keeper 21 on the top of the pole and in the rear of the lever 11. The forward end of the rod 19 is secured to the lever 14, near the pole 10, so that the leverage will be in favor of a single horse, and one horse pulling on the end of the lever 14 will counterbalance the effect of three horses pulling on the end of the lever 11, and it will be seen that the rods may be connected to the levers at different points, so as to properly adjust them according to the number and strength of the horses pulling on different sides of the pole.

It will be observed that when the horses are secured to the whiffletrees and started the strain will come directly on the rods 17 and 19, and that as these rods are connected by a chain, which moves over a pulley, they will easily adjust themselves and the draft will be perfectly equalized; but as the lever 11 is longer than the other the tendency will be to throw the pole to one side, and this is remedied by placing the short lever in advance of the longer one, thus giving the single horse a little advantage and overcoming all tendency to a side draft, and if the pole or vehicle to which it is secured has naturally a side draft it may be remedied by placing the lever 14 still farther in advance of the lever 11.

Having thus described our invention, we claim as new and desire to secure by Letters Patent—

A draft-equalizer comprising the whiffletree-lever 14, pivoted at the end of its short arm to the tongue and curved inward across the tongue at the juncture of its long and short arms, as shown at 15, the whiffletree-lever 11, pivoted at its inner end to the pole in rear of lever 14 and projecting oppositely thereto, the pulley 20 on the pole in rear of both levers, and the rods 17 19, pivoted at their outer or forward ends to the levers 11 14, respectively, and extending at their inner ends adjacent to the pulley and connected by a chain 18, substantially as set forth.

WALTER B. LAWRENCE.
FRANK W. REISINGER.

Witnesses:
S. M. ENDICOTT,
R. M. PARSONS.